US011228165B2

United States Patent
Guo et al.

(10) Patent No.: US 11,228,165 B2
(45) Date of Patent: Jan. 18, 2022

(54) CABLE TWISTING PROTECTION DEVICE, METHOD OF USE THEREOF AND WIND TURBINE

(71) Applicant: BEIJING GOLDWIND SCIENCE & CREATION WINDPOWER EQUIPMENT CO., LTD., Beijing (CN)

(72) Inventors: Dadong Guo, Beijing (CN); Yong Xu, Beijing (CN)

(73) Assignee: BEIJING GOLDWIN SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 784 days.

(21) Appl. No.: 16/074,005

(22) PCT Filed: Oct. 23, 2017

(86) PCT No.: PCT/CN2017/107264
§ 371 (c)(1),
(2) Date: Jul. 30, 2018

(87) PCT Pub. No.: WO2018/176818
PCT Pub. Date: Oct. 4, 2018

(65) Prior Publication Data
US 2021/0210938 A1    Jul. 8, 2021

(30) Foreign Application Priority Data
Mar. 28, 2017    (CN) .......................... 201710195974.3

(51) Int. Cl.
*H02G 3/04*    (2006.01)
*F03D 80/80*    (2016.01)
(Continued)

(52) U.S. Cl.
CPC .......... *H02G 3/0456* (2013.01); *F03D 80/85* (2016.05); *F16L 3/10* (2013.01); *F16L 3/22* (2013.01); *F05B 2260/30* (2013.01)

(58) Field of Classification Search
CPC .......... F03D 80/85; F03D 80/80; H02G 3/32; H02G 3/0456; F16L 3/10; F16L 3/22; F05B 2260/30
See application file for complete search history.

(56) References Cited

U.S. PATENT DOCUMENTS 2,404,531 A  *  7/1946  Robertson ............. F16L 55/035
248/68.1
5,170,008 A     12/1992  Evans et al.
(Continued)

FOREIGN PATENT DOCUMENTS

CA        3000907 A1 *  2/2019  .......... B64D 37/005
CN        201433861 Y    3/2010
(Continued)

OTHER PUBLICATIONS

First Indian Office Action dated Jan. 8, 2018; Application No. 201817028973.
(Continued)

*Primary Examiner* — Eret C McNichols (57) ABSTRACT

A cable twisting protection device, a method of use of the cable twisting protection device and a wind turbine are provided according to the present application. The cable twisting protection device includes: a cable clamping block, including a first clamping block and a second clamping block, wherein the first clamping block and the second clamping block are connected to form a tubular structure having a through hole at a middle and the through hole is configured to clamp a cable; and a cable partition plate, formed by splicing two or more separation plates, wherein grooves are provided in butting faces of each of the sepa- (Continued)

ration plates. The cable clamping blocks are fixedly connected to the cable partition plate, and the tubular structures of the cable clamping blocks are vertically aligned with the separation holes of the cable partition plate respectively.

19 Claims, 8 Drawing Sheets

(51) Int. Cl.
*F16L 3/10* (2006.01)
*F16L 3/22* (2006.01)

(56) References Cited

U.S. PATENT DOCUMENTS

| | | | | |
|---|---|---|---|---|
| 6,053,456 | A * | 4/2000 | Dispenza | F16L 5/10 |
| | | | | 248/56 |
| 6,713,891 | B2 | 3/2004 | Kirkegaard et al. | |
| 7,534,965 | B1 * | 5/2009 | Thompson | H02G 3/22 |
| | | | | 16/2.1 |
| 8,866,330 | B2 * | 10/2014 | Domesle | F03D 80/00 |
| | | | | 290/55 |
| 9,365,170 | B2 * | 6/2016 | Gronowicz, Jr. | B60R 16/0222 |
| 10,125,900 | B2 * | 11/2018 | Penrod | B60R 99/00 |
| 2002/0012582 | A1 * | 1/2002 | Kirkegaard | H02G 7/00 |
| | | | | 415/4.3 |
| 2004/0256138 | A1 | 12/2004 | Grubish et al. | |
| 2007/0079969 | A1 * | 4/2007 | Allenworth | F16L 3/22 |
| | | | | 166/368 |
| 2007/0102184 | A1 * | 5/2007 | Lord | H02G 5/025 |
| | | | | 174/68.2 |
| 2007/0246613 | A1 * | 10/2007 | Kennedy | H02G 3/32 |
| | | | | 248/56 |
| 2009/0206610 | A1 * | 8/2009 | Martin | F03D 80/82 |
| | | | | 290/55 |
| 2010/0247326 | A1 * | 9/2010 | Prebio | F03D 80/85 |
| | | | | 416/244 R |
| 2011/0042529 | A1 * | 2/2011 | Walter | F16L 3/223 |
| | | | | 248/68.1 |
| 2012/0048616 | A1 * | 3/2012 | Breen, IV | H02G 3/22 |
| | | | | 174/651 |
| 2014/0217741 | A1 * | 8/2014 | Christensen | F03D 80/85 |
| | | | | 290/55 |
| 2015/0001354 | A1 * | 1/2015 | Brabander | F03D 80/85 |
| | | | | 248/69 |
| 2015/0211659 | A1 * | 7/2015 | Even | H02G 3/18 |
| | | | | 248/69 |
| 2015/0214556 | A1 * | 7/2015 | Romand | H01M 6/44 |
| | | | | 29/825 |
| 2015/0222106 | A1 * | 8/2015 | Caspari | F16L 3/08 |
| | | | | 174/651 |
| 2015/0260166 | A1 * | 9/2015 | Olesen | H02G 1/14 |
| | | | | 290/55 |
| 2016/0322793 | A1 * | 11/2016 | Cuppen | H02G 3/32 |
| 2017/0307109 | A1 * | 10/2017 | McCarter | F16L 3/16 |
| 2018/0187657 | A1 * | 7/2018 | Nielsen | F03D 80/85 |
| 2021/0028609 | A1 * | 1/2021 | Robertson | H02G 3/0456 |
| 2021/0033222 | A1 * | 2/2021 | Short | F16L 5/025 |

FOREIGN PATENT DOCUMENTS

| | | | | |
|---|---|---|---|---|
| CN | 202280948 U | 6/2012 | | |
| CN | 202363825 U | 8/2012 | | |
| CN | 203871792 U | 10/2014 | | |
| CN | 104685744 A | 6/2015 | | |
| CN | 104718678 A | 6/2015 | | |
| CN | 205025694 U | 2/2016 | | |
| CN | 205117629 U | 3/2016 | | |
| CN | 106816840 A | 6/2017 | | |
| CN | 206640223 U | 11/2017 | | |
| DE | 10046157 A1 | 3/2002 | | |
| DE | 102012001409 A1 | 7/2013 | | |
| EP | 3284992 A1 * | 2/2018 | | F16L 3/24 |
| GB | 2255453 A * | 11/1992 | | F16L 3/22 |
| GB | 2466919 A * | 7/2010 | | H02G 3/30 |
| JP | 2008298051 A * | 12/2008 | | F03D 13/20 |
| WO | 2014/206536 A | 12/2014 | | |
| WO | 2017/005267 A1 | 1/2017 | | |

OTHER PUBLICATIONS

The First Australian Office Action dated Aug. 2, 2019; Appln. No. 2017395127.
The Extended European Search Report dated Feb. 4, 2020; Appln. No. 17892075.7.
International Search Report dated Jan. 25, 2018; PCT/CN2017/107264.

* cited by examiner

CABLE TWISTING PROTECTION DEVICE, METHOD OF USE THEREOF AND WIND TURBINE

CROSS REFERENCE TO RELATED APPLICATIONS

The present application is the national phase of International Application No. PCT/CN2017/107264, titled "CABLE TWISTING PROTECTION DEVICE, METHOD OF USE THEREOF AND WIND TURBINE", filed on Oct. 23, 2017, which claims the benefit of priority to Chinese Patent Application No. 201710195974.3 titled "CABLE TWISTING PROTECTION DEVICE, METHOD OF USE THEREOF AND WIND TURBINE", filed with the Chinese State Intellectual Property Office on Mar. 28, 2017, the entire disclosures thereof are incorporated herein by reference.

FIELD

The present application relates to the technical field of wind power generation equipment, and particularly relates to a cable twisting protection device, a method of use of the cable twisting protection device and a wind turbine.

BACKGROUND

A generator of a wind turbine is generally arranged in a nacelle (normally at a height of several tens of meters or even hundreds of meters) at a top of a tower. The electricity generated by the generator is required to be transmitted to the ground via cables, to facilitate the collection of electrical energy and the transmission of electrical energy to a power grid, and the cables are laid vertically downwards in a gravity direction inside the tower.

During the electricity generating process of the generator of the wind turbine, blades are required to be arranged facing the wind. When a wind direction changes, the blades and the nacelle are required to rotate with the change of the wind direction, which also makes the cables arranged downward along the tower from the nacelle to twist and swing. The twisted cables will have a corresponding displacement in the vertical direction.

After the cables are twisted, there will be friction between the cables, and the cables will be entangled together, which affects the heat dissipation of the cables. During the swinging process of the cables, the cables may also collide with ladders, platforms, a tower wall and other accessory equipment in the tower of the wind turbine, and thus being worn down. In order to prevent the cables from being entangled together during the twisting process and avoid the collisions and wear of the cables during the swinging process, a cable protection device is required to be designed to isolate the cables from each other, so that the cables will be spaced from each other by a certain distance after being twisted, and the cables will not collide directly with the internal structure of the tower.

According to a cable protection device known in the conventional technology, in the technical solution thereof, two parts butting with each other to form a tubular shape are employed to fix multiple bundles of cables at the same time. When the cables are twisted, since different cables are subjected to different pressures, some of the cables will play up and down because they are subjected to small forces, and the cable protection device will lose its due protection effect to these cables.

According to another cable protection device known in the conventional technology, a rolling connection between an inner ring and an outer ring is realized by using balls, which forms a structure similar to a ball bearing, however, the inner ring and the outer ring cannot generate an axial displacement, which causes that the cables will be stretched after the inner ring rotates, and thus causing damages to the cables.

SUMMARY

An object of the present application is to provide a cable twisting protection device, a method of use of the cable twisting protection device and a wind turbine, to employ a simple structure to solve the problem that it is required to space the cables apart for heat dissipation when the cables are twisted.

In an aspect of an embodiment according to the present application, a cable twisting protection device is provided, including:

two or more cable clamping blocks, wherein each of the cable clamping blocks includes a first clamping block and a second clamping block, the first clamping block and the second clamping block are connected to form a tubular structure having a through hole at a middle, and the through hole is configured to clamp a cable; and a cable partition plate formed by splicing two or more separation plates together, wherein grooves are provided in butting faces of the separation plates, to allow separation holes allowing the cable to pass through to be formed at the butting faces after the separation plates are spliced together, and the cable clamping blocks are mounted at the separation holes respectively; and wherein the cable clamping blocks are fixedly connected to the cable partition plate, the tubular structures of the cable clamping blocks are vertically aligned with the separation holes of the cable partition plate respectively, a size of each of the separation holes is larger than a size of the through hole of the respective tubular structure, and a projection of the through hole of the tubular structure on the cable partition plate is within the respective separation hole.

In another aspect of the embodiment according to the present application, a wind turbine is further provided, including the cable twisting protection device.

In another aspect of the embodiment according to the present application, a method of use of the cable twisting protection device is further provided, including: clamping each of the cable clamping blocks on a cable, and all the cable clamping blocks clamping the cables at a same height; then placing the cables clamped by the cable clamping blocks in the grooves of the separation plates, and splicing the separation plates into the cable partition plate to form the separation holes; and then fixedly connecting the cable clamping blocks to the cable partition plate.

The beneficial effects of the cable twisting protection device, the method of use of the cable twisting protection device and the wind turbine according to the embodiments of the present application are as follows, the cables are clamped and fixed by the cable clamping blocks, the cable clamping blocks are fixed by the cable partition plate formed by splicing, the cables are separated by the separation holes in the cable partition plate, so that the heat dissipation of the cables is ensured, and a problem that the cables will be twisted and entangled due to the rotation of a nacelle with the change of a wind direction is solved.

BRIEF DESCRIPTION OF THE DRAWINGS

The present application will be better understood from the following description of specific embodiments in conjunc

| Reference numerals in Figures: | | | |
|---|---|---|---|
| 100 | cable clamping block, | 110 | first clamping block, |
| 111 | first base, | 120 | second clamping block, |
| 121 | second base, | 130 | tubular structure, |
| 131 | clamping portion, | 200 | cable partition plate, |
| 210 | separation plate, | 211 | groove, |
| 212 | separation hole, | 220 | positioning hole, |
| 221 | circular hole, | 222 | oblong hole, |
| 223 | bolt fixing baffle block, | 300 | cable sheath, |
| 310 | necked portion, | 320 | fixing plate, |
| 321 | notch, | 330 | heat dissipation hole, |
| 400 | anti-collision baffle ring, | 410 | flared portion, |
| 500 | cable, | 600 | tower. |

DETAILED DESCRIPTION

Features in various aspects and exemplary embodiments of the present application are described in detail below. In the following detailed description, numerous specific details are set forth in order to provide thorough understanding of the present application. However, it is obvious to those skilled in the art that the present application may be implemented without some of these specific details. The following descriptions of the embodiments are merely intended to provide better understanding of the present application by illustrating examples of the present application. The present application is not limited to any specific configuration and algorithm presented hereinafter; and any modification, replacement and improvement of elements, components and algorithms are covered in the scope of the present application without departing from the spirit of the present application. In the drawings and the following description, well-known structures and techniques are not illustrated to avoid unnecessarily obscuring the present application.

Exemplary embodiments will be described more fully with reference to the accompanying drawings. However, the exemplary embodiments can be implemented in various forms and should not be construed as being limited to the embodiments illustrated herein; on the contrary, these embodiments are provided to make the application more all-sided and complete, and to fully convey the concepts of the exemplary embodiments to those skilled in the art. In the drawings, thicknesses of regions and layers may be exaggerated for clarity. Same reference numerals in the drawings indicate same or similar structures, and thus their detailed descriptions are omitted.

In addition, the described features, structures, or characteristics may be combined in any suitable manner in one or more embodiments. In the following description, numerous specific details are provided for thorough understanding of the embodiments of the present application. However, those skilled in the art will appreciate that the technical solutions of the present application may be implemented without one or more of the specific details, or other methods, components, materials and the like may be employed. In other situations, well-known structures, materials, or operations are not illustrated or described in detail to avoid obscuring the main technical ideas of the present application.

As shown in FIGS. 1 to 7, a cable twisting protection device is provided according to an embodiment of the present application, which includes a cable clamping block 100 and a cable partition plate 200.

Figure 1:
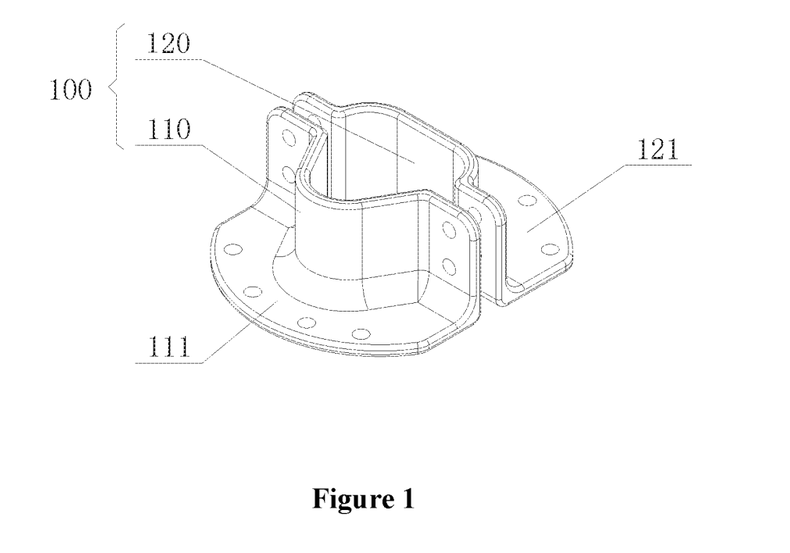
- FIG. 1 is a schematic perspective view showing the structure of a cable clamping block according to an embodiment of the present application.
Figure 2:
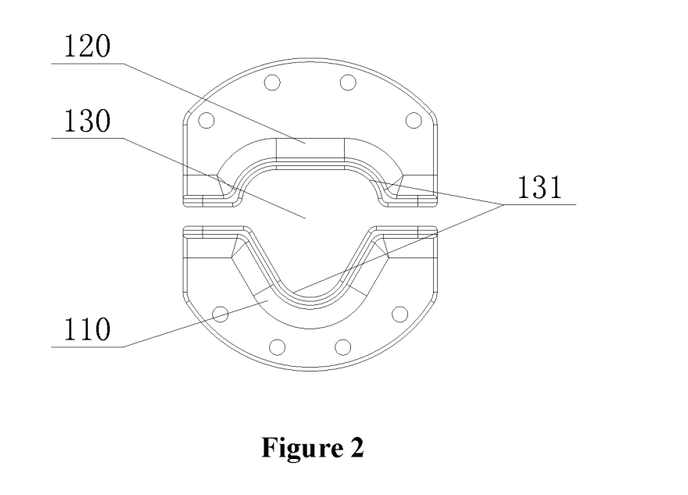
FIG. 2 is a schematic view showing a butting structure of the cable clamping block according to an embodiment of the present application.

Two or more cable clamping blocks 100 are provided. As shown in FIGS. 1 and 2, each of the cable clamping blocks 100 includes a first clamping block 110 and a second clamping block 120. The first clamping block 110 and the second clamping block 120 are connected to form a tubular structure 130, and the middle of the tubular structure 130 has a through hole for clamping a cable.

Figure 3:
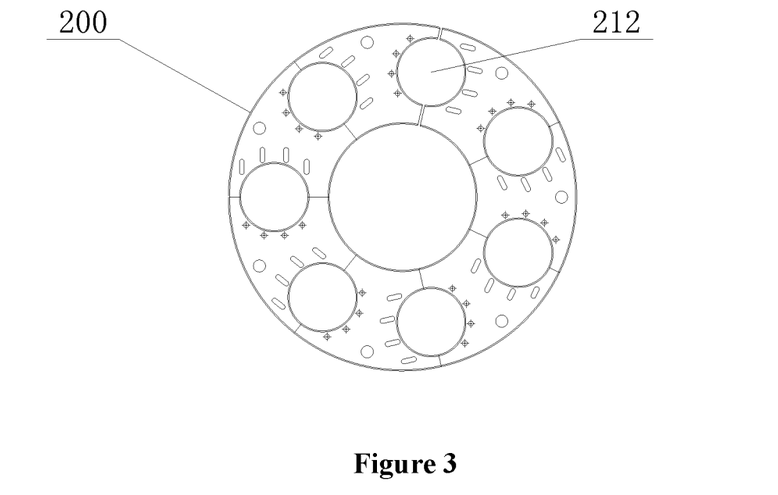
FIG. 3 is a schematic view showing the structure of a cable partition plate according to an embodiment of the present application.
Figure 4:
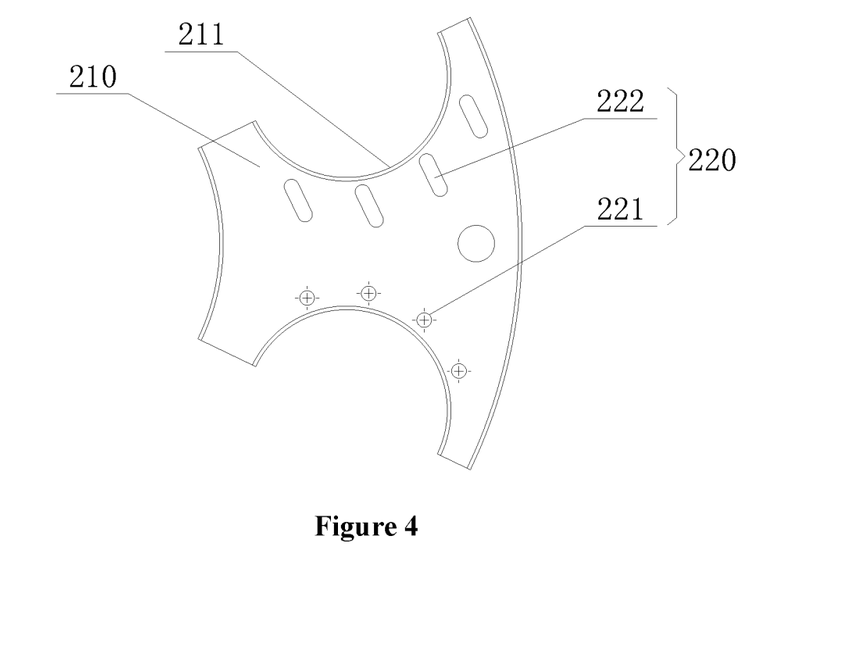
FIG. 4 is a schematic view showing the structure of a separation plate according to an embodiment of the present application.

As shown in FIGS. 3 and 4, the cable partition plate 200 is formed by splicing two or more separation plates 210 together, grooves 211 are provided in butting faces of the separation plates 210, so that separation holes 212 allowing the cables to pass through are formed at the butting faces after the separation plates are spliced together, and the cable clamping blocks 100 are correspondingly mounted at the separation holes 212.

The cable clamping blocks 100 are fixedly connected to the cable partition plate 200, the tubular structures 130 of the cable clamping blocks 100 are vertically aligned with the separation holes 212 of the cable partition plate 200 respectively, a size of each of the separation holes 212 is larger than a size of the through hole of the respective tubular structure 130, and a projection of the through hole of the respective tubular structure 130 on the cable partition plate 200 is within the separation hole 212.

The cable clamping block 100 according to this embodiment forms the tubular structure 130 by connecting two clamping blocks, and the tubular structure 130 has a certain length in an axial direction for clamping the cable. The cable partition plate 200 according to this embodiment is formed by splicing separated separation plates, and grooves 211 are provided in the butting faces, and the separation holes 212 are formed after the butting faces are butted. Each of the separation holes 212 is usually circular, and may also have other shapes, and may even have an irregular shape, however, it is required that the size of the separation hole 212 is larger than the size of the tubular structure 130, so that the cable 500 can pass through the separation hole 212 after being clamped and fixed by the cable clamping block 100, thus the cable 500 can be arranged from top to bottom in a vertical direction.

The cable partition plate 200 is usually circular after being formed by splicing, the separation holes 212 are uniformly distributed along a circumferential direction of the cable partition plate 200, and the separation holes 212 are spaced apart by a certain distance with respect to each other, to facilitate heat dissipation during the operation of the cable 500, and at the same time, avoid mutual friction and contact between the cables when the cables are driven by a nacelle to twist.

Optionally, as shown in FIG. 4, the grooves 211 in butting faces of each of the separation plates 210 are configured as semi-circular shaped grooves, so that each of the separation holes 212 formed by splicing the separation plates 210 is circular. The circular separation hole 212 facilitates the cable 500 to pass through, and there are no edges or corners on a circumference of the circular separation hole 212, and thus preventing the cable 500 from being scratched by the edge of the separation hole 212 when passing through the separation hole 212, and also preventing the cable 500 from being scratched by the separation hole 212 when the cable 500 is forced to twist during the operation.

All the separation plates 210 may be equally divided fan-shaped plates around a center of the cable partition plate 200. Two lateral sides of each of the fan-shaped plates are respectively provided with a semi-circular groove 211, so that the partition holes 212 uniformly distributed around the circumference of the cable partition plate 200 are formed after the separation plates 210 are spliced together to form the cable partition plate 200.

Optionally, as shown in FIG. 3, multiple positioning holes 220 are arranged around the circumferential direction of the separation hole 212 in every two adjacent separation plates 210 spliced together, and are configured to fixedly connect the cable clamping block 100. Generally, bolts are employed to pass through the positioning holes 220 to be connected to the cable clamping block 100, and thus fixing the cable clamping block 100. While using the bolts for fixation, the cable clamping blocks 100 are also used for connecting separation plates 210, that is, for the cable clamping block 100 formed by splicing, one part of the cable clamping block 100 is connected to one separation plate 210 by bolts, and another part of the cable clamping block 100 is connected to another separation plate 210 by bolts, so that the two adjacent separation plates 210 are fixed.

Figure 5:
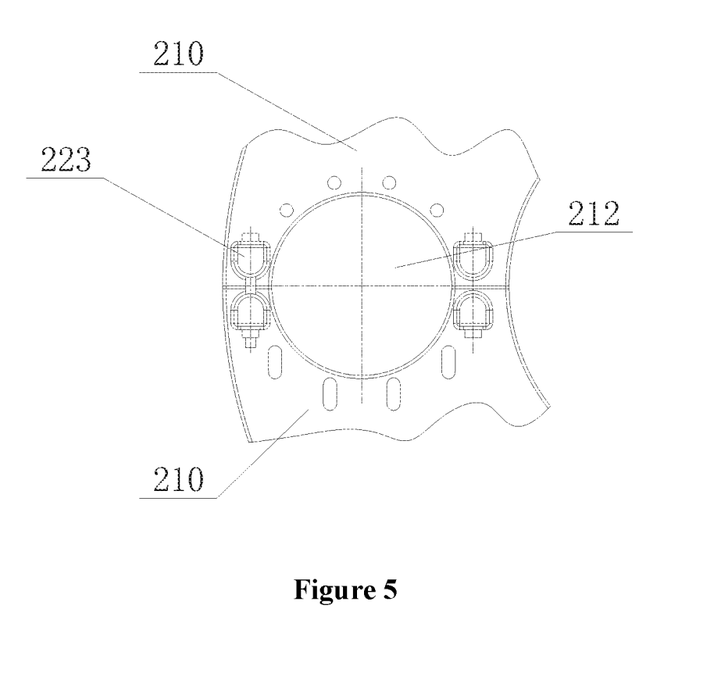
FIG. 5 is a schematic view showing a partial structure of the cable partition plate according to an embodiment of the present application.
Figure 6:
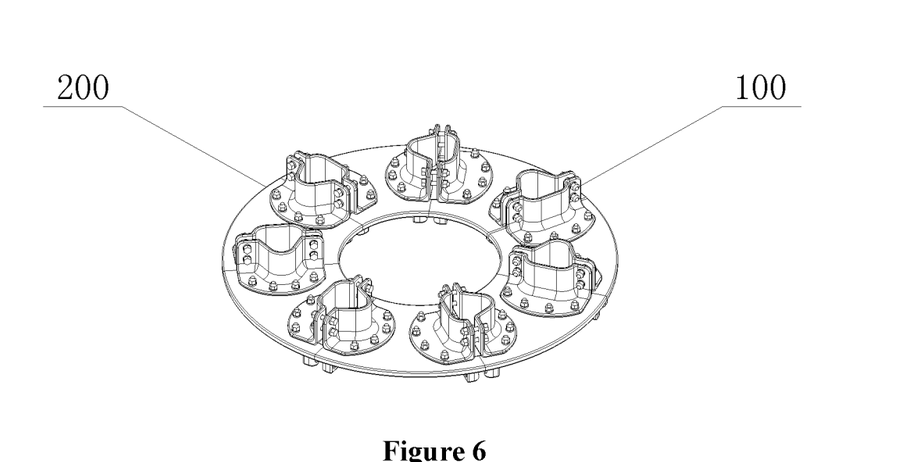
FIG. 6 is a schematic view showing the structure of a cable twisting protection device according to an embodiment of the present application.
Figure 7:
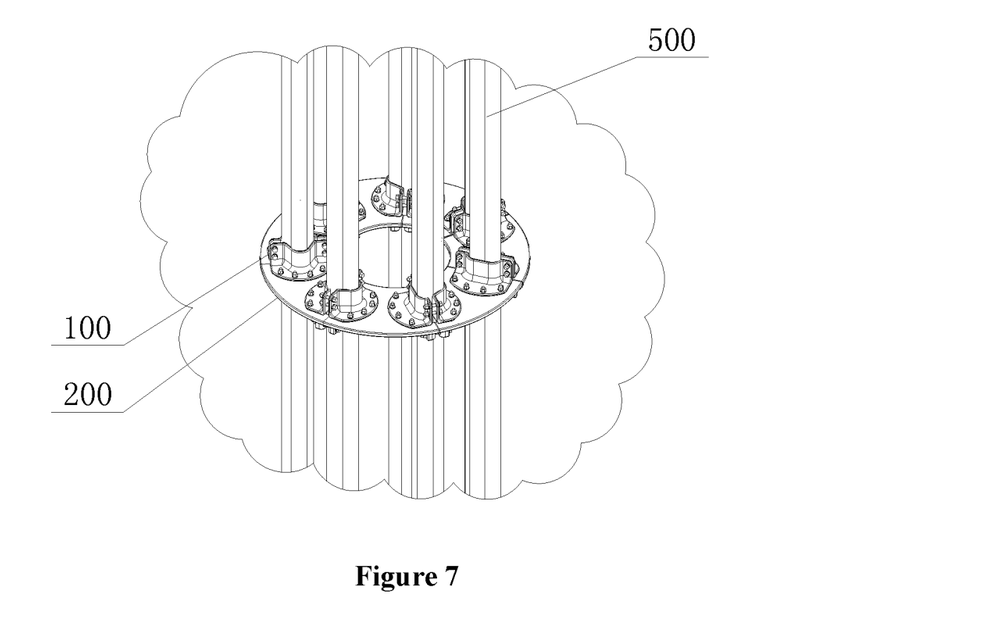
FIG. 7 is a schematic view showing the cable twisting protection device in a using state according to the embodiment of the present application.

Based on the understanding of those skilled in the art, the separation plates 210 can also be connected by other fixing manners. For example, as shown in FIG. 5, the separation plates 210 are butted through bolt fixing baffle blocks 223, and then are fixed by bolts. The bolt fixing baffle blocks 223 may be integrally formed with the separation plate 210, and may also be welded on the separation plate 210 by manners such as welding and the like.

Optionally, a group of partitioning holes at one side of the separation hole 212 are configured as circular holes 221, and a group of partitioning holes at another side of the separation hole 212 opposite to the circular holes 221 are configured as oblong holes 222. The circular holes 221 are configured to position the cable clamping block 100. The oblong holes 222 are configured to be connected to the first base 111 or the second base 121, so that when the first clamping block 110 and the second clamping block 120 are connected, a distance between the first clamping block 110 and the second clamping block 120 can be adjusted through the bolts, to adjust a clamping force between the first clamping block 110 and the second clamping block 120. The oblong holes 222 can facilitate adjusting the distance between the first clamping block 110 and the second clamping block 120.

Optionally, as shown in FIG. 3, a hole is opened at a center of the cable partition plate 200, to form a ring shape. After the hole is opened at the center of the cable partition plate 200, the weight of the cable partition plate 200 can be reduced, and the central opened portion can be used for allowing airflow or other cables or ropes to pass through, which makes the structural configuration more reasonable.

Optionally, connecting faces of a body of the first clamping block 110 and a body of the second clamping block 120 are connected by bolts. By controlling a locking position of the bolts, a connecting distance between the first clamping block 110 and the second clamping block 120 is adjustable, so that the clamping force on the cable can be controlled.

Optionally, an end portion of the body of the first clamping block 110 is provided with a first base 111, and an end portion of the body of the second clamping block 120 is provided with a second base 121. The first base 111 and the second base 121 may be fixed on the cable partition plate 200 by bolts, and may also be fixed on the cable partition plate 200 by clamping or other connecting manners.

Optionally, an inner wall surface of the tubular structure 130 is provided with three clamping portions 131 each in the shape of a cambered surface and extending in an axial direction of the tubular structure. The three clamping portions 131 can each clamp one cable 500, and the three clamping portions 131 are distributed in a regular triangle shape around an axis of the tubular structure 130 to form. The cambered surface shape generally matches with a cylindrical surface shape of the clamped cable 500, so that when the cables 500 are clamped by the clamping portions 131, surface contact is formed between surfaces of the cables 500 and the clamping portions 131, thus the clamping forces on the cables are distributed uniformly, and meanwhile the friction forces between the cables 500 and the clamping portions 131 are increased, so that a clamping effect of the cables is better and damages to the surfaces of the cables 500 in the clamping process can be avoided. With the design of the three clamping portions 131, the cable clamping block 100 can clamp three cables 500 at the same time. With the distribution structure of the three clamping portions 131 in the shape of a regular triangle, the three clamped cables 500 are butted pairwise to each other, and thus the cables 500 are more compact with respect to each other.

Based on the understanding of those skilled in the art, the through hole of the tubular structure 130 may also be cylindrical shaped, and in this case, one cable clamping block 100 can only clamp one cable. A diameter of the through hole of the tubular structure 130 should be slightly smaller than a diameter of the clamped cable 500, so that the clamped cable 500 can be subjected to a suitable clamping force.

As shown in FIGS. 8 to 11, the cable twisting protection device according to this embodiment further includes a cable sheath 300 configured to be sleeved outside edges of the cable partition plate 200, and the cable sheath 300 extends beyond two side surfaces of the cable partition plate 200 in the axial direction. The cable sheath 300 can protect the cable partition plate 200. When the cable partition plate 200 wobbles inside a tower 600, the cable sheath 300 outside the cable partition plate 200 can receive an impact force instead of the cable partition plate 200, and buffer the impact force, thereby ensuring the stability of the cables 500 fixed on the cable partition plate 200.

Figure 8:
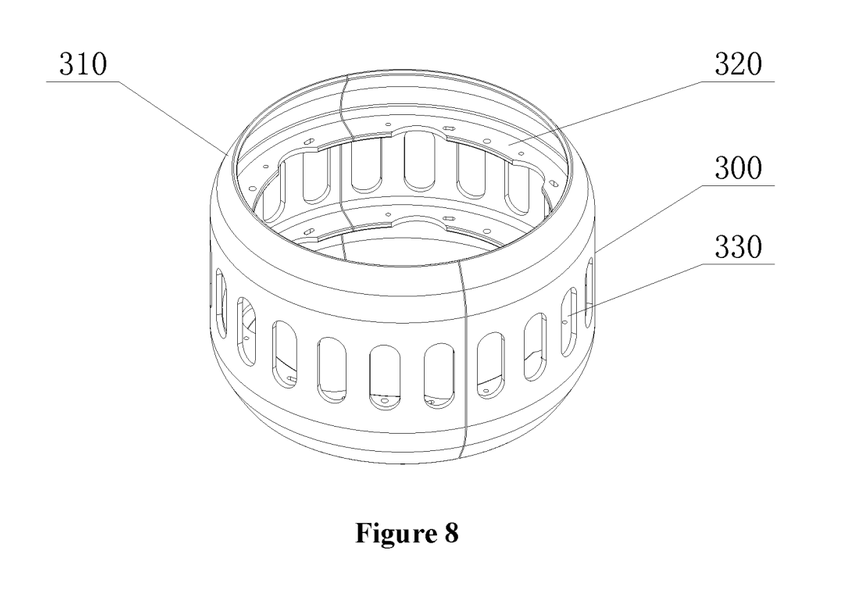
FIG. 8 is a schematic perspective view showing the structure of a cable sheath according to an embodiment of the present application.
Figure 9:
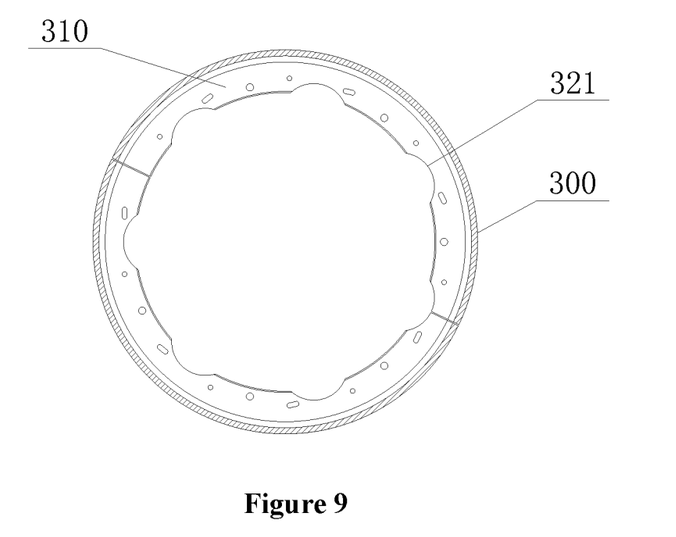
FIG. 9 is a schematic view showing the structure of a horizontal section of the cable sheath in FIG. 8.
Figure 10:
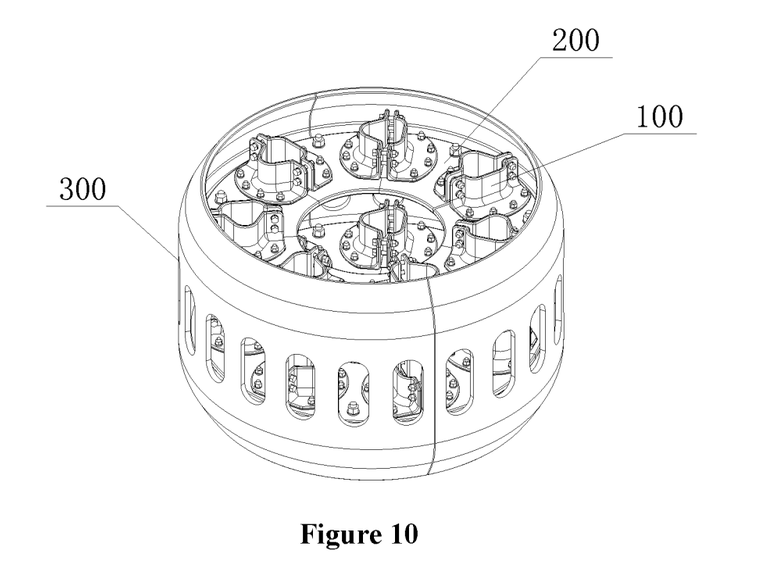
FIG. 10 is a schematic perspective view showing the structure of a cable twisting protection device according to an embodiment of the present application.
Figure 11:
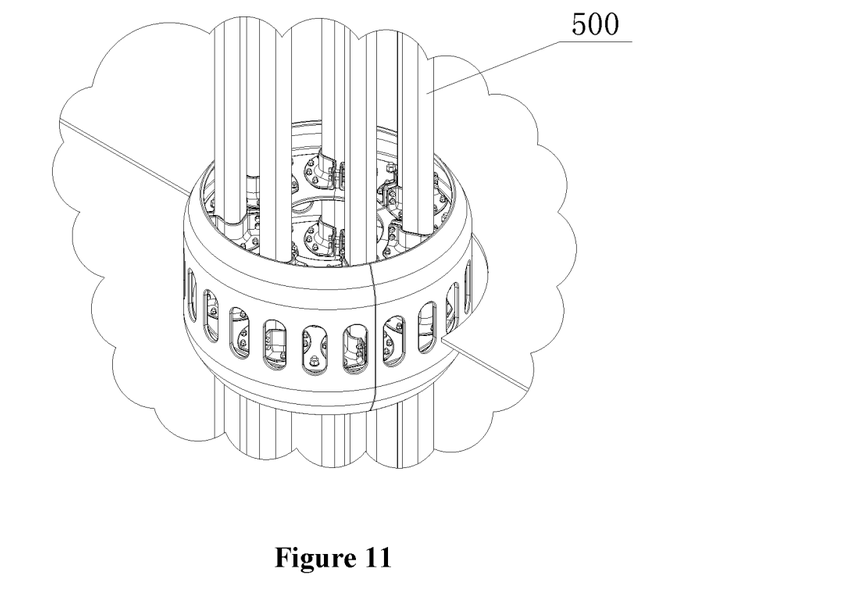
FIG. 11 is a schematic view showing the cable twisting protection device in a using state according to the embodiment of the present application.

The cable sheath 300 is embodied as a cylinder structure. Several heat dissipation holes 330 are uniformly provided in a wall of the cable sheath 300, and the design of the heat dissipation holes 330 facilitates the airflow transversely passing through the cable sheath 300, and meanwhile facilitates the ascending or descending airflow to dissipate the heat generated by the cable 500 in operation through the heat dissipation holes 330 in the cable sheath 300. In addition, the heat dissipation holes 330 also facilitate the observation when the cable clamping blocks 100 and the cable partition plate 200 inside the cable sheath 300 are maintained, and tools can pass through the heat dissipation holes 330 to enter an interior of the cable sheath 300 for adjustment. Generally, each of the heat dissipation holes 330 may be configured as an oblong structure arranged in an axial direction of the cable sheath 300, or may also be in other shapes, for example, a circular shape or a squared shape or the like.

The cable sheath 300 is formed by connecting two or more sheath sub-bodies. Generally, the cable sheath 300 is formed by splicing two semi-cylindrical shaped structure into a cylindrical shaped structure, however, those skilled in the art may also use three or more sheath sub-bodies for splicing, which is not specifically limited herein. After the cable sheath 300 is formed by connecting the sheath sub-bodies, detachable connecting manners such as bolt connection and the like can be employed at the connecting positions, so that operators can conveniently disengage the connection during a maintenance process of the entire cable sheath 300, which facilitate adjusting a fixing position of the cable 500.

Two end portions of the cable sheath 300 are configured as necked portions 310 respectively. An outer diameter of each of the necked portions 310 gradually decreases from a main body to the respective end portion of the cable sheath 300 in the axial direction. During implementation, the necked portion 310 may be in a regular conical shape, or in a spherical shape or a horn shape or the like. Since the cable 500 will twist during rotation with the nacelle, the cable 500 will generate a displacement in the vertical direction when the cable 500 twists itself. With the design of the cable sheath 300, when the displacement of the cable 500 in the vertical direction occurs, the cable sheath 300 fixing the cable partition plate 200 will generate a displacement accordingly in the vertical direction. With the design of the necked portions 310, when the displacement of the cable sheath 300 in the vertical direction occurs, the collision of the cable sheath 300 with other structures inside the tower 600 can be reduced, thereby protecting the entire cable sheath 300 and ensuring the safe use of the cable partition plate 200 inside the cable sheath.

Generally, two cable partition plates 200 can be mounted inside the cable sheath 300, so that the cable 500 can be fixed at positions of both the two cable partition plates 200, and thus the structures of the cable partition plates 200 are more stable.

A fixing plate 320 is arranged on an inner wall of each of the sheath sub-bodies, the cable partition plate 200 is fixed on the fixing plate 320. The fixing plate 320 is arranged along the inner wall of the cable sheath 300, to form an annular shape. Bolt holes are provided in the fixing plate 320 at positions where the fixing plate 320 is connected to the cable partition plate 200, to form a structure similar to a flange. The fixing plate 320 may be integrally formed with the cable sheath 300, and may also be fixed inside the cable sheath 300 by manners such as welding, bolt connection and the like.

Notches 321 are provided in the fixing plate 320 at positions corresponding to the separation holes 212. The notches 321 match with the separation holes 212 in shape. With the design of the notches 321, a size of the entire cable sheath 300 can be reduced, which makes the structure of the cable sheath 300 and the cable partition plate 200 more compact, and makes the configuration more reasonable. Thus, while reducing an overall size of the cable sheath 300 and the cable partition plate 200, an overall weight of the entire cable twisting protection device can be reduced, thereby reducing the tension on the cables 500.

Figure 12:
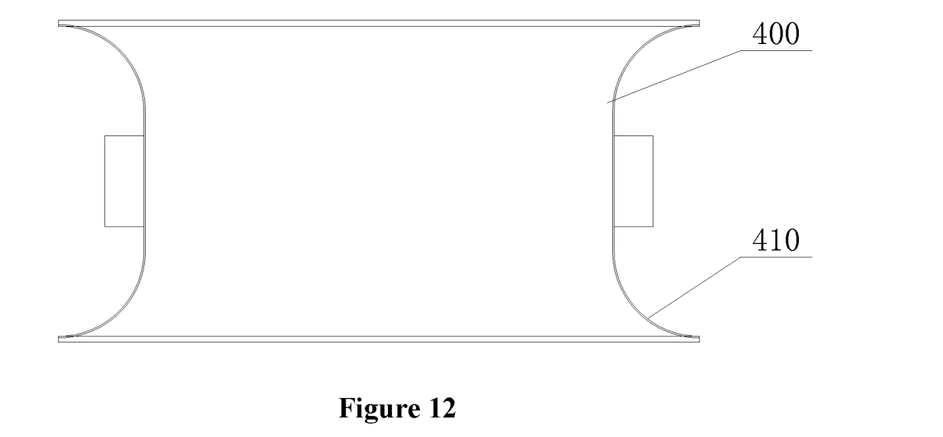
FIG. 12 is a schematic view showing the structure of a longitudinal section of an anti-collision baffle ring according to an embodiment of the present application.
Figure 13:
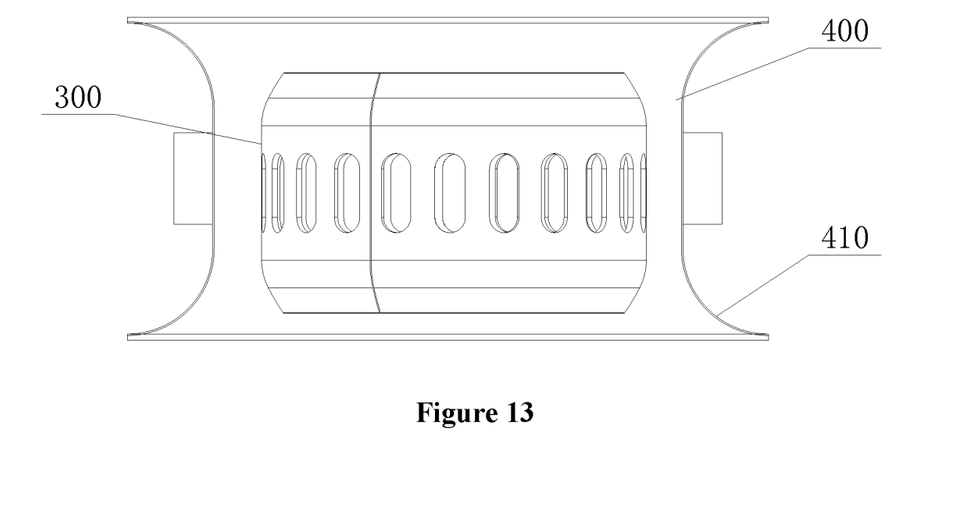
FIG. 13 is a schematic view showing the assembly of the anti-collision baffle ring and the cable sheath according to an embodiment of the present application.

As shown in FIGS. 12 and 13, the cable twisting protection device according to this embodiment further includes an anti-collision baffle ring 400. The anti-collision baffle ring 400 is arranged outside the cable sheath 300, and a clearance is provided between an inner wall of the anti-collision baffle ring 400 and the cable sheath 300. As described above, when the cable sheath 300 wobbles inside the tower 600, the kinetic energy generated by the wobble of the cable sheath 300 can be effectively absorbed by the anti-collision baffle ring 400, to prevent the amplitude of wobble of the cable sheath 300 from being excessively large. In addition, when the displacement of the entire cable sheath 300 in the vertical direction occurs, the cable sheath 300 can be guided by the anti-collision baffle ring 400, so that the cable sheath 300 can move vertically along the anti-collision baffle ring 400.

Two end portions of the anti-collision baffle ring 400 are configured as flared portions 410 respectively. An inner diameter of each of the flared portions 410 gradually increases from a main body to the respective end portion of the anti-collision baffle ring 400 in the axial direction. The flared portion 410 may be in a regular conical shape, or may be in a spherical shape or a horn shape or the like. In a case that the displacement of the cable sheath 300 in the vertical direction is excessively large, during a process of reset of the cable sheath 300, the flared portions 410 can effectively guide the cable sheath 300 back into the anti-collision baffle ring 400, to prevent an edge of the cable sheath 300 from rigidly colliding (point-to-face collision or point-to-point collision) with the anti-collision baffle ring.

Optionally, the anti-collision baffle ring 400 may be formed by connecting two or more baffle ring sub-bodies. The sub-body connection manner can facilitate the mounting of the anti-collision baffle ring 400. After the cable sheath 300 and the cable partition plate 200 and the cable clamping blocks 100 both at an upper portion of the cable sheath 300 are installed, it is only required to place the cable sheath at a position where the anti-collision baffle ring 400 is mounted, and then connect sub-body structures by an auxiliary tool to form the anti-collision baffle ring 400. This structural design also facilitates disassembly and replacement of the anti-collision baffle ring 400 during the maintenance process.

In the cable twisting protection device according to this embodiment, the cables are clamped and fixed by the cable clamping blocks 100, the cable clamping blocks 100 are fixed by the cable partition plate 200 formed by splicing, and the cables are separated by the separation holes in the cable partition plate 200, which ensures the heat dissipation of the cables 500, and addresses a problem that the cables 500 will be twisted and entangled due to the rotation of the nacelle with the change of a wind direction. In addition, by employing a modular assembly, the cable twisting protection device according to this embodiment can not only realize the installation when the wind turbine is assembled, but also realize the maintenance operations such as installation, disassembly, and replacement during the operation and maintenance of the wind turbine, which greatly improves the convenience of the cable maintenance, and solves a problem in the conventional technology that the cable twisting protection device is difficult to maintain and disassemble after being mounted. Besides, two or more cable clamping blocks 100 are employed to clamp and fix the cables 500, thereby solving a problem in the conventional technology that the cable twisting protection device cannot stably clamp the cables 500 and thus causes relative movements between the cables 500 and the cable twisting protection device during the operation of the wind turbine and further causes the cables 500 to slide down.

Figure 14:
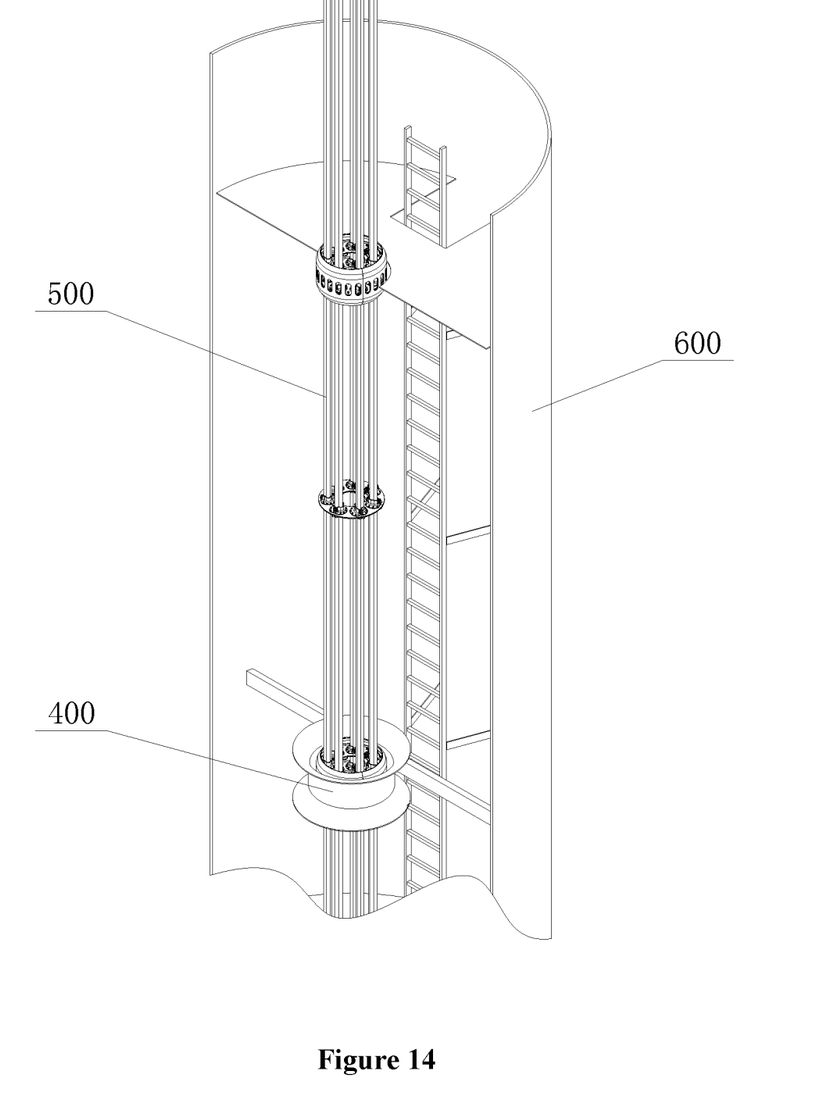
FIG. 14 is a schematic view showing the internal structure of a tower of a wind turbine employing the cable twisting protection device according to an embodiment of the present application.

As shown in FIG. 14, a wind turbine is further provided according to an embodiment of the present application, which includes the cable twisting protection device according to the above embodiments.

Three cable twisting protection devices are provided and are mounted at intervals along the cables 500. Each of the three cable twisting protection devices may be any one of the cable twisting protection devices according to the above embodiments. For example, as shown in FIG. 14, the cable twisting protection device at the top employs the structure having the cable clamping blocks 100, the cable partition plate 200 and the cable sheath 300; the cable twisting protection device at the middle employs the structure having the cable clamping blocks 100 and the cable partition plate 200; and the cable twisting protection device at the bottom employs the structure having the cable clamping blocks 100, the cable partition plate 200, the cable sheath 300 and the anti-collision baffle ring 400, wherein the anti-collision baffle ring 400 is fixed inside the tower 600 of the wind turbine and is mounted coaxially with the tower 600.

Those skilled in the art may choose only one type of the cable twisting protection devices provided in the above embodiments according to the requirement of use, that is, the above three cable twisting protection devices may have the same structure.

Based on the understanding of those skilled in the art, the wind turbine according to the embodiment of the present application may employ only one cable twisting protection device, or may also employ four or more cable twisting protection devices. Generally, the number of the cable twisting protection device can be set according to a rotation range of the nacelle, a height of the tower 600 and the number of the cables 500 of the wind turbine. Those skilled in the art may also combine the cable twisting protection device according to this embodiment with other auxiliary structures of the wind turbine.

In conjunction with FIGS. 1 to 14, a method of use of the cable twisting protection device is further provided according to an embodiment of the present application, which specifically includes:

clamping each of the cable clamping blocks 100 on a respective cable, and all the cable clamping blocks 100 clamping the cables at a same height; then placing the cables clamped by the cable clamping blocks 100 in the grooves 211 of the separation plates 210 respectively, and splicing the separation plates 210 together into the cable partition plate 200 to form the separation holes 212; and then fixedly connecting the cable clamping blocks 100 to the cable partition plate 200.

With the method of use of the cable twisting protection device according to this embodiment, in the entire process, it is only required to clamp the cables 500 on the cable clamp blocks 100, and in a process of assembling the separation plates 200, a modular design is employed for assembly, and there are not many operations on the cables 500, and the assembly can be realized by using an ordinary wrench or other tools, which is simple and feasible.

Optionally, the method of use of the cable twisting protection device according to this embodiment further includes: fixedly connecting the cable partition plate 200 to the fixing plates 320 on the inner walls of the sheath sub-bodies, and connecting the sheath sub-bodies to form the cable sheath 300.

After the cable partition plate 200 is assembled, the cable partition plate 200 is fixed on the fixing plates 320 on the inner walls of the sheath sub-bodies, and then the cable sheath 300 is assembled. This assembly method also employs the modular design, to facilitate the assembly, and also facilitate disassembly and replacement of the cable sheath 300 during the maintenance process of the cable twisting protection device.

Optionally, the method of use of the cable twisting protection device according to this embodiment further includes: placing the cable sheath 300 in the anti-collision baffle ring 400 formed by connecting the baffle ring sub-bodies, and coaxially mounting the anti-collision baffle ring 400 inside the tower 600.

The assembly of the anti-collision baffle ring 400 is performed after the cable sheath 300 is assembled. Since the anti-collision baffle ring 400 is formed by sub-body connection, the assembly process is simple, and the disassembly and replacement of the anti-collision baffle ring 400 during the maintenance process of the cable twisting protection device are convenient.

It should be understood by those skilled in the art that, the above embodiments are all exemplary rather than limitative. Different technical features in different embodiments can be combined to achieve beneficial results. Through studying the drawings, the specification and the claims, those skilled in the art should understand and implement other varied embodiments of the disclosed embodiments. In the claims, the term "comprising" does not exclude other devices or steps; the indefinite article "a" or "an" does not exclude a plurality; the terms "first" and "second" are used to indicate a name rather than to indicate any specific order. Any reference numerals in the claims should not be construed as limitation to the scope of protection. The functions of the various parts in the claims can be realized by a single hardware or software module. The presence of certain technical features in different dependent claims does not mean that these technical features cannot be combined to achieve beneficial results.

What is claimed is:

1. A cable twisting protection device, comprising:
   two or more cable clamping blocks, wherein each of the cable clamping blocks comprises a first clamping block and a second clamping block, the first clamping block and the second clamping block are connected to form a tubular structure having a through hole at a middle, and the through hole is configured to clamp a cable; and a cable partition plate formed by splicing two or more separation plates together, wherein grooves are provided in butting faces of the separation plates, to allow separation holes allowing the cable to pass through to be formed at the butting faces after the separation plates are spliced together, and the cable clamping blocks are mounted at the separation holes respectively; and wherein the cable clamping blocks are fixedly connected to the cable partition plate, the tubular structures of the cable clamping blocks are vertically aligned with the separation holes of the cable partition plate respectively, a size of each of the separation holes is larger than a size of the through hole of the respective tubular structure, and a projection of the through hole of the tubular structure on the cable partition plate is within the respective separation hole; and a plurality of positioning holes are provided along a circumferential direction of each of the separation holes on two adjacent separation plates spliced together, and are configured to fixedly connect the cable clamping blocks.

2. The cable twisting protection device according to claim 1, wherein the grooves in the butting faces of each of the separation plates are configured as semi-circular shape, to allow the separation holes formed by splicing the separation plates to have a circular shape.

3. The cable twisting protection device according to claim 1, wherein a group of partitioning holes at one side of the separation hole are circular holes, and a group of partitioning holes at another side, opposite to the circular holes, of the separation hole are oblong holes.

4. The cable twisting protection device according to claim 1, wherein a hole is opened at a center of the cable partition plate, to allow the cable partition plate to form a ring shape; and wherein the separation holes are distributed uniformly around the center of the cable partition plate.

5. The cable twisting protection device according to claim 1, wherein an end portion of the body of the first clamping block is provided with a first base, an end portion of the body of the second clamping block is provided with a second base, and the first base and the second base are fixedly connected to the cable partition plate.

6. The cable twisting protection device according to claim 1, wherein an inner wall surface of the tubular structure is provided with three clamping portions each having a cambered surface shape and extending in an axial direction of the tubular structure, the three clamping portions each clamp one cable, and the three clamping portions are distributed in a regular triangle shape around an axis of the tubular structure.

7. The cable twisting protection device according to claim 1, further comprising a cable sheath configured to be sleeved outside edges of the cable partition plate, and the cable sheath extending beyond two side surfaces of the cable partition plate in an axial direction.

8. The cable twisting protection device according to claim 7, wherein the cable sheath is formed by connecting two or more sheath sub-bodies.

9. The cable twisting protection device according to claim 8, wherein a fixing plate is provided on an inner wall of each of the sheath sub-bodies, the cable partition plate is fixed on the fixing plate; and the fixing plates are arranged in an annular shape along an inner wall of the cable sheath.

10. The cable twisting protection device according to claim 9, wherein a notch is provided in each of the fixing plates at a position corresponding to the respective separation hole, and the notch matches with the separation hole in shape.

11. The cable twisting protection device according to claim 7, wherein two end portions of the cable sheath are configured as necked portions respectively, and an outer diameter of each of the necked portions gradually decreases from a main body to the respective end portion of the cable sheath in the axial direction.

12. The cable twisting protection device according to claim 7, further comprising an anti-collision baffle ring, wherein the anti-collision baffle ring is arranged outside the cable sheath, and a clearance is provided between an inner wall of the anti-collision baffle ring and the cable sheath.

13. The cable twisting protection device according to claim 12, wherein two end portions of the anti-collision baffle ring are configured as flared portions respectively, and an inner diameter of each of the flared portions gradually increases from a main body to the respective end portion of the anti-collision baffle ring in an axial direction.

14. The cable twisting protection device according to claim 12, wherein the anti-collision baffle ring is formed by connecting two or more baffle ring sub-bodies.

15. A wind turbine, comprising the cable twisting protection device according to claim 1.

16. The wind turbine according to claim 15, wherein the cable twisting protection device comprises an anti-collision baffle ring, the anti-collision baffle ring is configured to be fixed inside a tower, and mounted coaxially with the tower.

17. A method of use of the cable twisting protection device according to claim 1, comprising:

clamping each of the cable clamping blocks on a cable, and all the cable clamping blocks clamping the cables at a same height;

then placing the cables clamped by the cable clamping blocks in the grooves of the separation plates, and splicing the separation plates into the cable partition plate to form the separation holes; and then fixedly connecting the cable clamping blocks to the cable partition plate.

18. The method of use according to claim 17, further comprising:

fixedly connecting the cable partition plate to fixing plates on inner walls of sheath sub-bodies, and connecting the sheath sub-bodies to form a cable sheath.

19. The method of use according to claim 17, further comprising:

placing the cable sheath in an anti-collision baffle ring formed by connecting baffle ring sub-bodies, and coaxially mounting the anti-collision baffle ring inside a tower.

* * * * *

UNITED STATES PATENT AND TRADEMARK OFFICE
CERTIFICATE OF CORRECTION

PATENT NO. : 11,228,165 B2  
APPLICATION NO. : 16/074005  
DATED : January 18, 2022  
INVENTOR(S) : Dadong Guo and Yong Xu Page 1 of 1

It is certified that error appears in the above-identified patent and that said Letters Patent is hereby corrected as shown below:

On the Title Page

Item (73) Assignee:
BEIJING GOLDWIN SCIENCE & CREATION WINDPOWER EQUIPMENT CO., LTD., Beijing (CN)
Is changed to:
BEIJING GOLDWIND SCIENCE & CREATION WINDPOWER EQUIPMENT CO., LTD., Beijing (CN)

Signed and Sealed this
Twenty-fourth Day of May, 2022

Katherine Kelly Vidal
*Director of the United States Patent and Trademark Office*